United States Patent [19]

Goade et al.

[11] 3,750,537
[45] Aug. 7, 1973

[54] HYDRAULIC CYLINDER WITH SELF-LOCKING END CAP

[75] Inventors: James C. Goade, Joliet; John A. McDonald, Morton; Herschel M. Williamson, Joliet, all of Ill.

[73] Assignee: Caterpillar Tractor Co., Peoria, Ill.

[22] Filed: June 28, 1971

[21] Appl. No.: 157,534

[52] U.S. Cl............................. 92/165, 151/14.5
[51] Int. Cl............................................. F01b 31/00
[58] Field of Search........................ 151/7, 14.5; 85/32.1; 92/165; 285/39

[56] References Cited
UNITED STATES PATENTS

| | | | |
|---|---|---|---|
| 1,562,954 | 11/1925 | Goodall | 285/39 |
| 3,451,697 | 6/1969 | Bula | 285/39 |
| 3,417,670 | 12/1968 | Madland | 92/165 R |
| 3,550,668 | 12/1970 | Coyle | 151/7 |
| 2,093,177 | 6/1963 | Villo | 151/7 |
| 990,732 | 4/1911 | Harper | 151/14.5 |
| 197,932 | 12/1877 | Carney | 151/14.5 |
| 103,348 | 5/1870 | Ligon | 151/14.5 |
| 3,294,139 | 12/1966 | Derziosi | 151/7 |
| 2,087,185 | 7/1937 | Dillon | 151/14.5 |
| 3,488,666 | 1/1970 | Podell | 151/7 |

FOREIGN PATENTS OR APPLICATIONS

| | | | |
|---|---|---|---|
| 803,489 | 1/1957 | Great Britain | 151/7 |
| 662,863 | 1/1949 | Great Britain | 151/7 |

Primary Examiner—Charles J. Myhre
Assistant Examiner—R. H. Lazarus
Attorney—Charles M. Fryer et al.

[57] ABSTRACT

A self-locking, internally threaded end cap for a hydraulic cylinder comprises a tool engaging aperture formed through a sidewall thereof adapted for tightening the end cap in place on the cylinder. A plastic patch completely circumvents the aperture, internally of the end cap, for sealing and locking purposes. The patch is formed by sprinkling a powdered plastic, such as nylon, through a hole formed in a template and onto heated portions of the threads.

3 Claims, 3 Drawing Figures

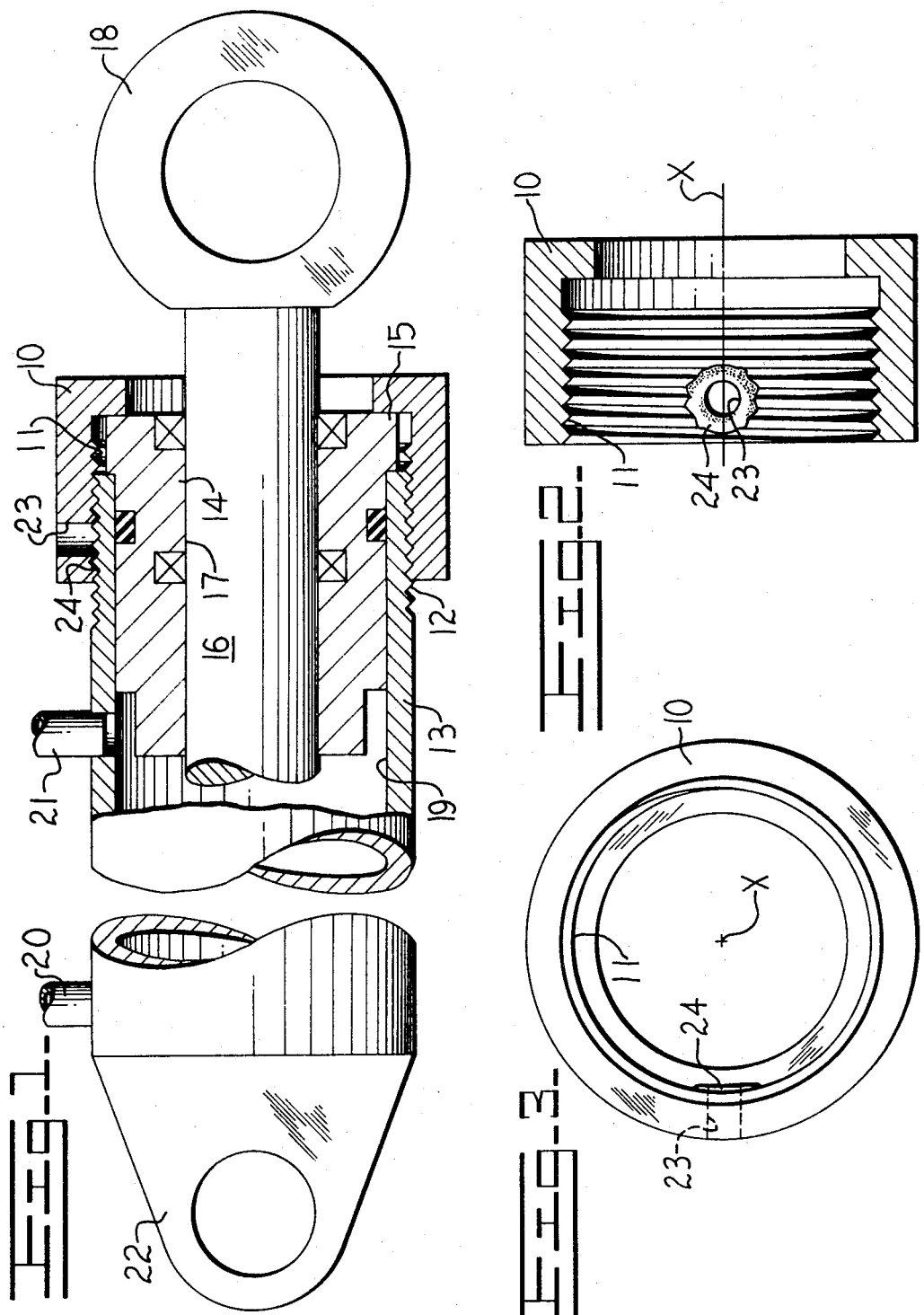

HYDRAULIC CYLINDER WITH SELF-LOCKING END CAP

BACKGROUND OF THE INVENTION

This invention generally relates to self-locking, threaded members or fasteners and more particularly relates to a self-locking end cap for a hydraulic cylinder.

The inherent "memory" and related physical characteristics of certain plastics has encouraged their use in patch form on self-locking, threaded fasteners. Nylon, for example, may be bonded to selected thread portions of a male or female fastener to provide a reusable and highly efficient thread lock means.

SUMMARY AND OBJECTS OF THE INVENTION

An object of the present invention is to provide an economical self-locking threaded member which is adapted for expeditious installation and removal. The member is cylindrical and has a tool engaging aperture formed through a sidewall thereof and a deformable and reusable plastic patch bonded to selected portions of the threads. The patch circumvents the aperture to seal against entry of foreign particles therethrough and to perform a locking function when the fastener is threaded onto a mating second member. In the preferred embodiment of this invention, the members respectively constitute the end cap and housing of a hydraulic cylinder.

BRIEF DESCRIPTION OF THE DRAWINGS

Other objects of this invention will become apparent from the following description and accompanying drawings wherein:

FIG. 1 is a partially sectioned, side elevational view of a double-acting hydraulic cylinder;

FIG. 2 is a sectional view of an internally threaded end cap of the FIG. 1 cylinder; and FIG. 3 is an end elevational view of the FIG. 2 end cap.

DESCRIPTION OF THE PREFERRED EMBODIMENT

Although the self-locking member or fastener illustrated in FIGS. 1–3 constitutes an internally threaded, cylindrical end cap 10 of a double-acting hydraulic cylinder, it should be understood that the member can take other forms. For example, a self-locking member may have threads formed externally thereon for threaded engagement with an internally threaded second member or could comprise a polygonal side internally threaded nut.

The end cap, symmetrically disposed on a longitudinal axis X thereof (FIG. 2), is internally threaded at 11 to engage with external threads 12 formed on a housing or second member 13 of the cylinder. In this application, the end cap holds a tubular combined bearing and sealing gland 14 in place within the housing. In particular, an annular land 15 is formed on the gland to be locked in place between an end of the housing and the end cap.

The housing has a piston and rod assembly reciprocally mounted therein, including a rod 16 which extends through a bearing bore 17 formed in the gland. One end of the rod has an eye 18 formed thereon which is adapted for attachment to a work implement (not shown). The other end of the rod is secured to a piston (not shown) which is reciprocally mounted in a bore 19 of the housing.

Hydraulic fluid may be alternately introduced into and exhausted from a closed chamber defined on each side of the piston, via lines 20 and 21, in a conventional manner. One end of the housing has an apertured flange 22 formed thereon adapted for attachment to the frame of an earthworking machine, for example. A spanner wrench or the like (not shown) is adapted to engage a work tool receiving aperture 23, formed through a sidewall of the end cap transversely of axis X (FIG. 3), to tighten or loosen the cap on the housing.

The self-locking of the end cap on the housing is achieved by means of a generally circular plastic patch 24 bonded to confined portions of unmodified and uninterrupted threads 11, closely adjacent to aperture 23, (FIGS. 2 and 3). The plastic material used therefor can be selected from any of the well-known reusable and thermoplastic resins or epoxies (e.g., nylon) which will exhibit the desired self-locking and "memory" characteristics when suitably sized and composed. U.S. Pat. Nos. 2,741,288; 3,061,455; 3,093,177; 3,294,139; 3,498,352; 3,554,258 and 3,568,746 disclose typical examples of such materials and methods for applying same to threaded fasteners.

The plastic patch preferably completely circumvents aperture 23 and has sufficient radial thickness relative to axis X (FIG. 3) so that in addition to the self-locking function, it will also serve as a seal to prevent the egress of dirt, water and other foreign materials into the threaded area. In particular, the patch blocks the portions of threads 12 which intersect the aperture to prevent the materials from spiraling along the thread cavities and into the interior of cap 10. Ingress of such materials into the cap would induce corrosion and rusting of the metallic threads thereby making it difficult, if not impossible, to remove the cap from the cylinder.

One method for applying the patch to the end cap is as follows: The end cap is first cleaned, such as shot-blasting; The circumferential area around aperture 23, whereat the plastic patch is to be applied, is preferably coated with a thin coat of primer (e.g., an epoxy resin), which is compatible with the plastic material utilized, to insure a good bond between the plastic and the metal threads; The end cap is heated to a temperature in the approximate range of from 400° to 500°F.; A curved template (not shown), having a hole formed therethrough corresponding to the size of patch 24 and slightly larger than aperture 23, is then placed in position in the end cap to expose aperture 23 centrally thereof; A powdered plastic (e.g., nylon) is preferably sprinkled onto the heated thread portions, exposed by the aperture formed in the template, to at least partially melt same; and the finished end cap is cooled resulting in the semi-donut shaped patch configuration illustrated in FIGS. 2 and 3.

What is claimed is:

1. A hydraulic cylinder disposed on a longitudinal axis thereof comprising, an end cap having uninterrupted spiral threads formed internally thereon to extend in the direction of and about said longitudinal axis, means forming a work tool receiving aperture through a sidewall of said end cap, transversely of said longitudinal axis, and through a portion of said threads, and a generally circular patch of plastic material, having self-locking characteristics, bonded and confined to portions of said threads closely adjacent to said aperture to completely circumvent said aperture and a housing having said end cap threadedly mounted thereon, said plastic patch having a sufficient radial thickness relative to said longitudinal axis to be deformed by the threaded engagement between said end cap and said housing to resist relative turning movement therebetween and to seal the area whereat the thread portions of said housing intersect said aperture.

2. The invention of claim 1 further comprising a tubular gland, mounted in said cylinder, including an annular land disposed in locked position between an end of said housing and said end cap.

3. The invention of claim 2 further comprising a piston and rod assembly, reciprocally mounted in said housing, having a rod thereof extending through said tubular gland and in sealing relationship therewith.

* * * * *